June 15, 1965  T. M. HERBERT  3,189,128
DISC BRAKE INSTALLATION
Filed Sept. 7, 1962  2 Sheets-Sheet 1

INVENTOR.
THOMAS M. HERBERT
BY
*Douglas R. McKechnie*
ATTORNEY

INVENTOR.
THOMAS M. HERBERT
BY
Douglas R. McKechnie
ATTORNEY 3,189,128
DISC BRAKE INSTALLATION
Thomas M. Herbert, Huntingdon Valley, Pa., assignor to The Budd Company, Philadelphia, Pa., a corporation of Pennsylvania
Filed Sept. 7, 1962, Ser. No. 221,990
5 Claims. (Cl. 188—59)

This invention relates to a disc brake for a railway car truck and has, among its objects, the provision of a novel and improved disc brake which is simple in construction, has relatively few parts, is rugged for heavy duty operation, and can be readily dismantled for maintenance operations.

Other objects and advantages of the invention will be apparent from the following description taken in connection with the accompanying drawings, wherein.

Figure 1:
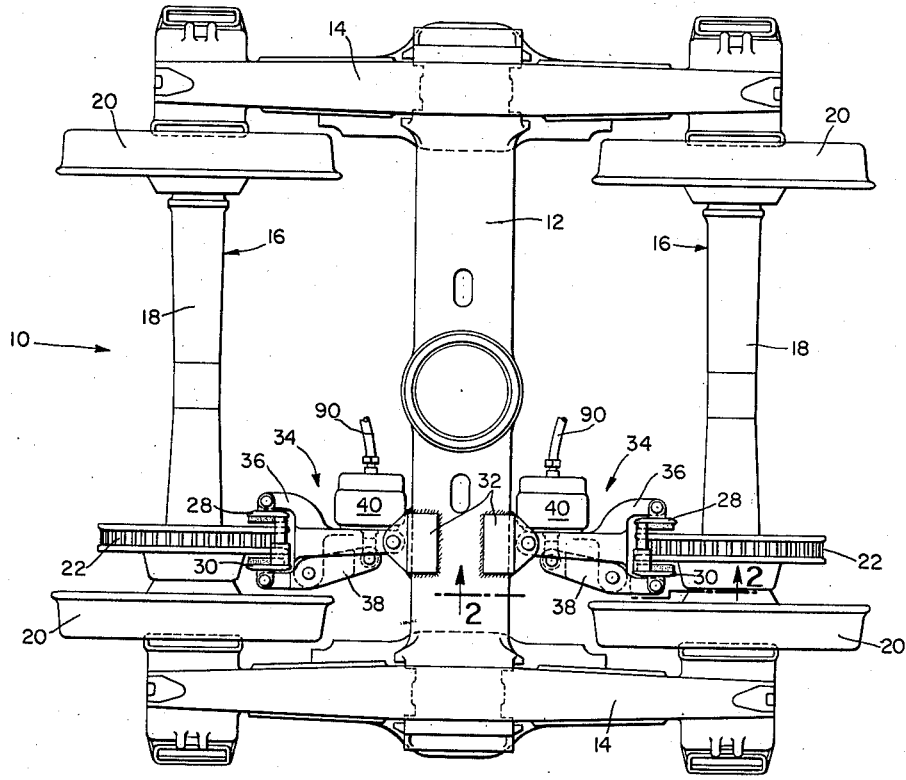
FIGURE 1 is a top plan view of a railway car truck embodying the invention.

Referring now to the drawings, the invention is illustrated as applied to a railway car truck 10 having a truck bolster 12 supported by a pair of side frames 14 which, in turn, are supported by a pair of wheel and axle units 16. Each of these units comprises an axle 18 and a pair of laterally spaced wheels 20.

Each wheel and axle unit 16 is associated with a ventilated brake disc 22 fixedly secured to the hub of one of wheels 20 and on one side of the longitudinal center of the truck. Each brake disc has an inboard braking surface 24 and an outboard braking surface 26 engageable with a pair of brake shoes 28 and 30.

Figure 2:
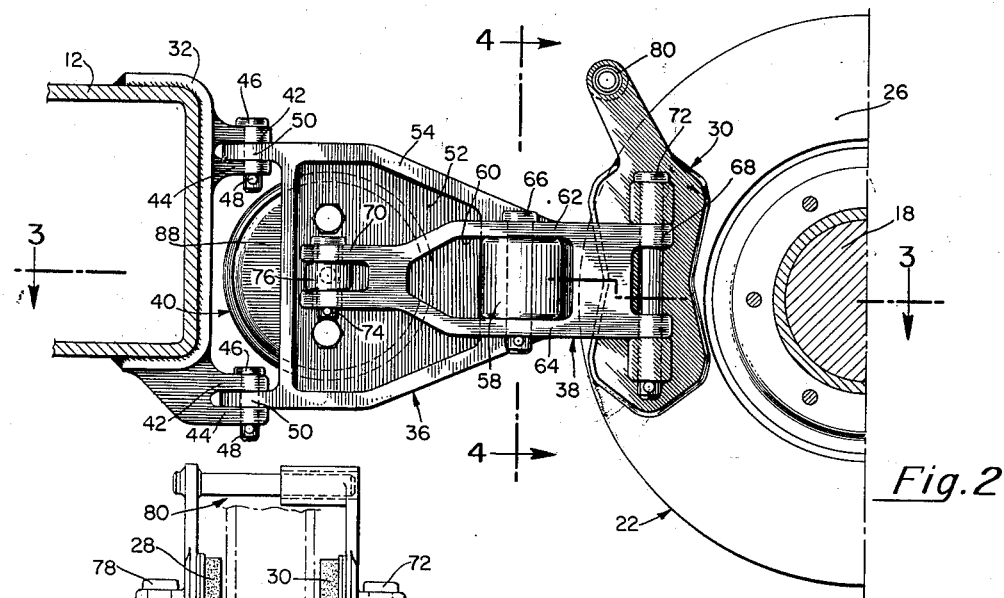
FIGURE 2 is a side elevational view, partly in section, along lines 2—2 of FIGURES 1 and 3.
Figure 4:
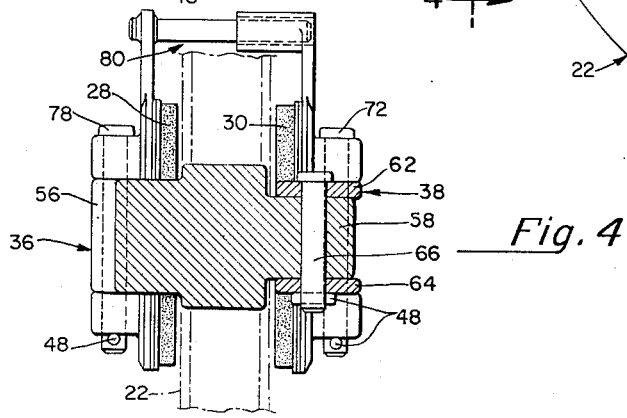
FIGURE 4 is a transverse, vertical sectional view along lines 4—4 of FIGURE 2, FIGURES 2-4 being enlarged for clarity.

Mounted on truck bolster 12, in a back-to-back relationship, is a pair of forwardly and rearwardly facing brackets 32 each supporting in bilateral symmetry a unit brake assembly 34 comprising brake shoes 28 and 30, a pair of brake tong levers 36 and 38, and a brake cylinder actuator 40. As best seen in FIGURE 2, each bracket 32 has a C-shaped, vertical section conforming to the outer surface of the abutting portion of the truck bolster and a pair or pairs of vertically spaced support ears 42 and 44 provided with vertically aligned bores for receiving pivot pin means comprising a pair of removable pivot pins 46 each having a removable fastener 48. The pivotal axis afforded by pins 46 is located between the planes of surfaces 24 and 26 and can thus be considered to be within the plane of rotation of disc 22.

Since assemblies 34 are bilaterally symmetrical, only one need be described in detail. Brake tong lever 36 has a pair of vertically spaced ears 50 each disposed between a pair of support ears 42 and 44 and held in place by the associated pivot pin 46 so that brake tong lever 36 is pivotally mounted on and supported by truck bolster 12 via bracket 32 and pivot pins 46. Ears 50 are spaced apart a relatively wide distance, approximately the same as the length of a brake shoe, to provide a wide, strong base for supporting the assembly and absorbing the brake reaction forces developed when the brakes are applied. Thus, dependent on the direction of rotation of brake disc 22, the brake reaction forces will place the upper pivot pin 46 in shear in one longitudinal direction (either forward or rearward) and the lower pivot pin 46 in shear in the opposite direction, upon application of the brakes.

Brake tong lever 36 is shaped irregularly and has a flat, longitudinal, vertical plate portion 52 bounded by a rim 54, the plate portion having the shape of a combined rectangle and trapezoid. Brake tong lever 36 also includes a brake shoe supporting portion 56 which extends inwardly and longitudinally and terminates inwardly of braking surface 24, and a brake tong lever supporting portion 58 that extends outwardly and supports brake tong lever 38.

Brake tong lever 38 is also shaped irregularly and has as split or divided medial portion provided with an aperture 60 that divides the medial portion into two vertically spaced branches 62 and 64 which straddle the free or outboard end of portion 58, branches 62 and 64 and portion 58 having aligned bores through which a removable pivot pin 66 passes. Thus, brake tong lever 38 is pivotally supported on brake tong lever 36 for pivotal movement about a vertical axis parallel to the pivotal axis of brake tong lever 36.

Brake tong lever 38 has a pair of bifurcated ends 68 and 70 pivotally attached by removable pivot pins 72 and 74 to brake shoe 30 and the actuating rod 76 of actuator 40, respectively.

Similarly, the end of portion 56 is bifurcated and is pivotally connected via pivot pin 78 to brake shoe 28. Brake shoes 28 and 30 are provided with guide pin means 80 which maintains the operative faces of the brake shoes parallel to each other and to the braking surfaces 24 and 26.

Actuator 40 is conventional and is illustrated as a selectively actuated, pneumatically operated brake cylinder actuator having a cylinder 88 bolted to plate 52 on the inboard side thereof, and actuating rod 76 which extends through an aperture in plate 52 and is connected to brake tong lever 38 in the manner previously described. Actuator 40 is connected to a hose 90 through which fluid pressure can be supplied from the pneumatic brake system of the train.

Actuating rod 76 is horizontal and extends transversely of the truck. The actuating rod and cylinder 88 are so arranged that the forces they apply to levers 36 and 38, when the brakes are applied, are equal and opposite and act on levers 36 and 38 with equal moment arms. Also, brake shoes 28 and 30 are mounted at equal moment arm lengths relative to the fulcrum so that they also apply equal but opposite forces to brake disc 22.

Figure 3:
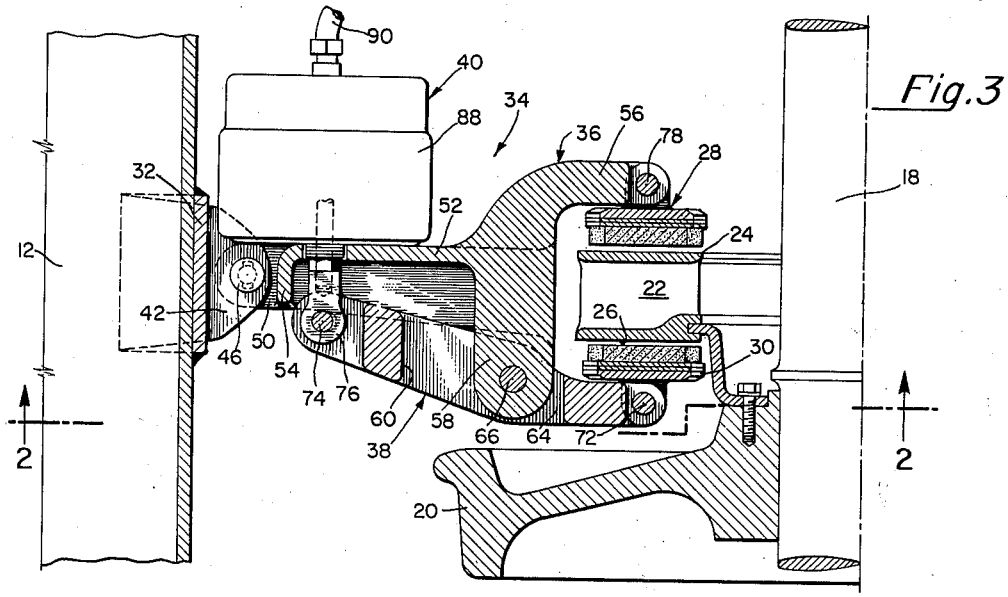
FIGURE 3 is a horizontal sectional view along line 3—3 of FIGURE 2.

When actuator 40 is inactuated, the brake shoes are held in inoperative positions such as those illustrated in FIGURES 1 and 3. In such positions, the opposed surfaces of the brake shoes are held apart by actuator 40 a distance greater than the thickness of brake disc 22.

Lateral movement of the disc 22 relative to the brake shoes or swinging movement of assembly 34 about pin 46 due to motion of the truck, or a combination of such movements, can cause one or the other, but not both, of brake shoes 28 and 30 to hit or abut the disc 22.

Figure 5:
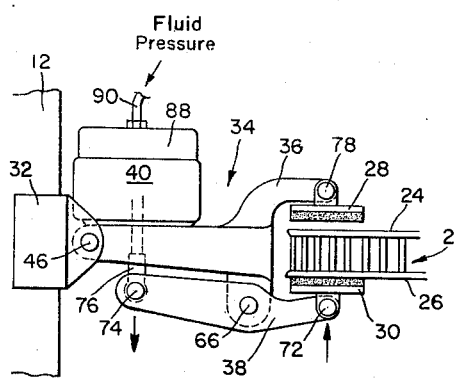
FIGURES 5 and 6 are somewhat schematic, top plan views illustrating various operating positions.
Figure 6:
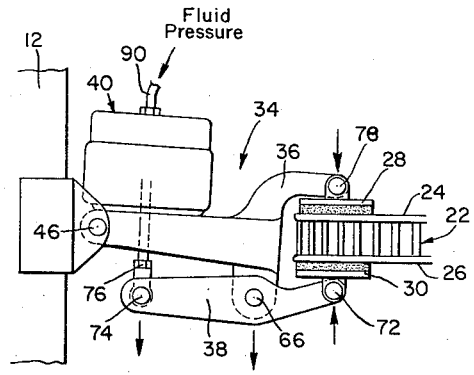

When fluid pressure is supplied to actuator 40 to apply the brakes, the initial movement of the brake shoes and brake tong levers is dependent upon the positions of the brake shoes relative to the brake disc. If the brake shoes are spaced from the brake disc, actuation of actuator 40 moves rod 76 outwardly and thereby pivots lever 38 in a counterclockwise direction as viewed from above about pivot pin 66 causing brake shoe 30 to move into engagement with surface 26 as shown in FIGURE 5. During the course of such movement, lever 38 acts as a first class lever where it is medially pivoted and the actuating and reaction forces are applied to the ends. Continued actuation of actuator 40 shifts the operation of lever 38 to one of a second class lever wherein lever 38 pivots about pivot pin 72 and thereby pulls portion 58 outwardly to pivot lever 36 clockwise as viewed from above about pivot pin 46 until brake shoe 28 engages braking surface 24 as shown in FIGURE 6. Thereafter, actuator 40 increases the normal forces between the brake shoes and the disc to develop the necessary braking forces for deceleration of the truck. When the normal forces are being applied, levers 36 and 38 act, in a manner similar to common ice tongs, as two first class levers medially pivoted upon each other.

If, at the start of the braking operation, brake shoe 30 engages the disc 22, actuation of actuator 40 pivots lever 38 counterclockwise, as viewed from above, about pivot pin 72 and thereby pivots lever 36 clockwise until brake shoe 28 engages the disc.

On the other hand, if brake shoe 28 engages disc 22 at the start of the braking operation, actuation of actuator 40 merely pivots lever 38 about pivot pin 66 until brake shoe 30 moves into engagement with disc 22.

To release the brakes, actuator 40 is deactuated by relief of the fluid pressure so that actuating rod 76 moves into cylinder 88 and thereby pivots levers 36 and 38 to their inoperative positions.

A device constructed in accordance with the foregoing has several advantages, some of which are as follows. First, the number of parts is relatively low and the parts are simple. Consequently, the device is easy to construct, to assemble and to maintain. Second, because assembly 34 is a unit brake assembly, it can be removed readily and replaced by another unit. Similarly, the brake shoes can be readily removed for replacement purposes. Third, the device operates even though there exists both lateral and vertical relative movements between the brake disc and the brake shoes.

While only a single embodiment has been shown, it will be apparent to those skilled in the art that many changes can be made in the details and arrangement of parts without departing from the scope of the invention as defined in the appended claims.

What is claimed is:

1. In a disc brake mechanism for a railway car truck having a rotating disc and a supporting member to enable pivotal movement of the mechanism about an axis transverse to the axis of rotation of the disc, the combination comprising, a first tong member having a first brake block on one of its ends and pivotally mounted to said supporting member about said transverse axis at its other end, a second tong member having a second brake block at one of its ends, pivot means interconnecting said first and second tong members intermediate their respective ends for rotation about a common axis parallel to said transverse axis, and actuator means connected to said first tong member and to the other end of said second tong member to cause relative pivotal movement therebetween wherein said first and second brake blocks are moved into and out of frictional engagement with said brake disc.

2. In a brake mechanism having a rotatable brake disc and a pair of opposed brake shoes disposed at opposite faces of said disc, brake shoe actuating means comprising a pair of first and second tongs having forward and rearward ends, said forward ends supporting said brake shoes, a pin directly pivotally connecting said tongs together intermediate their forward and rearward ends, the axis of said pin being transversely disposed with respect to the axis of said disc, means for pivotally supporting the rearward end of the first of said tongs about an axis disposed transversely with respect to the axis of said disc, and power means for actuating said tongs, said power means having parts axially moveable with respect to each other, one of said parts being connected to the first of said tongs intermediate its rearward end and said pin and other of said parts being connected to the rearward end of the second of said tongs whereby, relative axial movement of said parts causes said tongs to pivotally move relative to each other to actuate said brake shoes into and out of engagement with faces of said disc.

3. A brake mechanism in accordance with claim 2 wherein the pair of first and second tongs are free from crossing arrangement.

4. In a disc brake for a railway truck having a transverse member, a wheel and axle unit, and a brake disc having a pair of braking surfaces, the combination of: a first lever adapted to be pivotally mounted at one end on the transverse member so that the other end of said first lever terminates opposite to and spaced laterally from one of the braking surfaces, said first lever having a transverse lever supporting portion; a second lever pivotally mounted at a point intermediate to the ends thereof on said lever supporting portion and having one end opposite to and spaced from the other of the braking surfaces; a pair of brake shoes carried by said other end of said first lever and said one end of said second lever, said brake shoes being adapted to be moved between operative and inoperative positions relative to the braking surfaces; and a brake cylinder actuator for operating said first and second levers to apply the brakes, said actuator comprising a cylinder mounted on one of said levers and an actuating rod connected to the other of said levers, whereby the actuating forces are applied to the other end of said second lever and to the first lever at a point adjacent to said one end.

5. A disc brake in accordance with claim 4 wherein said brake levers are pivoted about vertical axes, the axis of movement of said first lever being located within the plane of rotation of the brake disc.

References Cited by the Examiner

UNITED STATES PATENTS

| 2,781,106 | 2/57 | Lucien | 188—73 X |
| 3,092,211 | 6/63 | Herbert | 188—59 |

FOREIGN PATENTS

| 828,873 | 2/60 | Great Britain. |
| 1,080,585 | 4/60 | Germany. |
| 1,195,739 | 5/59 | France. |

ARTHUR L. LA POINT, *Primary Examiner.*

EUGENE G. BOTZ, *Examiner.*